United States Patent
Yun et al.

(10) Patent No.: US 9,905,050 B2
(45) Date of Patent: Feb. 27, 2018

(54) METHOD OF PROCESSING IMAGE AND ELECTRONIC DEVICE THEREOF

(71) Applicant: Samsung Electronics Co., Ltd., Suwon-si, Gyeonggi-do (KR)

(72) Inventors: Yong-Sang Yun, Suwon-si (KR); Chi-Hyun Cho, Suwon-si (KR); Jong-Chul Choi, Suwon-si (KR); Chang-Ryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 14/721,594

(22) Filed: May 26, 2015

(65) Prior Publication Data

US 2015/0339861 A1    Nov. 26, 2015

(30) Foreign Application Priority Data

May 26, 2014 (KR) ........................ 10-2014-0063038

(51) Int. Cl.
*G06T 19/00* (2011.01)
*G06T 7/20* (2017.01)
*G02B 27/01* (2006.01)

(52) U.S. Cl.
CPC .......... *G06T 19/006* (2013.01); *G02B 27/017* (2013.01); *G06T 7/20* (2013.01); *G02B 2027/014* (2013.01); *G02B 2027/0138* (2013.01); *G02B 2027/0187* (2013.01)

(58) Field of Classification Search
None
See application file for complete search history.

(56) References Cited

U.S. PATENT DOCUMENTS

| | | | |
|---|---|---|---|
| 6,084,556 A | 7/2000 | Zwern | |
| 9,213,185 B1 * | 12/2015 | Starner | G02B 27/017 |
| 2013/0135353 A1 | 5/2013 | Wheeler et al. | |
| 2013/0222426 A1 * | 8/2013 | Hymel | G06T 19/006 |
| | | | 345/633 |
| 2013/0278632 A1 * | 10/2013 | Cho | G06T 19/006 |
| | | | 345/633 |
| 2014/0176751 A1 * | 6/2014 | Kuzuya | G06T 3/403 |
| | | | 348/222.1 |
| 2015/0248783 A1 * | 9/2015 | Fayle | G06T 19/006 |
| | | | 345/633 |
| 2015/0279105 A1 * | 10/2015 | Hanai | G06F 1/1686 |
| | | | 345/633 |
| 2015/0317834 A1 * | 11/2015 | Poulos | G06F 3/012 |
| | | | 345/619 |
| 2016/0033770 A1 * | 2/2016 | Fujimaki | G06T 19/006 |
| | | | 345/8 |

FOREIGN PATENT DOCUMENTS

| | | |
|---|---|---|
| JP | 2007-134785 A | 5/2007 |
| JP | 2013-093705 A | 5/2013 |

* cited by examiner

*Primary Examiner* — Yu Chen
(74) *Attorney, Agent, or Firm* — Jefferson IP Law, LLP

(57) ABSTRACT

A method of operating an electronic device is provided. The method includes detecting a movement of the electronic device, and changing a scale of a displayed image based on the movement.

14 Claims, 17 Drawing Sheets

METHOD OF PROCESSING IMAGE AND ELECTRONIC DEVICE THEREOF

CROSS-REFERENCE TO RELATED APPLICATION(S)

This application claims the benefit under 35 U.S.C. § 119(a) of a Korean patent application filed on May 26, 2014 in the Korean Intellectual Property Office and assigned Ser. No. 10-2014-0063038, the entire disclosure of which is hereby incorporated by reference.

TECHNICAL FIELD

The present disclosure relates to a method of processing an image and an electronic device thereof.

BACKGROUND

As information communication technologies and semiconductor technologies have developed, various electronic devices have been developed as multimedia devices that provide various multimedia services. For example, an electronic device provides various multimedia services such as a messenger service, a broadcasting service, a wireless Internet service, a camera service, a music reproduction service, or the like.

The electronic device has developed to be slim and to be a body contact type which is readily carried (for example, a Head Mounted Device (HMD)). In application, a HMD type electronic device is mounted or worn on the head of a user and provides various functions.

The above information is presented as background information only to assist with an understanding of the present disclosure. No determination has been made, and no assertion is made, as to whether any of the above might be applicable as prior art with regard to the present disclosure.

SUMMARY

A Head Mounted Device (HMD) type electronic device provides a user with a three dimensional (3D) image so as to provide a virtual environment service. However, the virtual environment service has a limit in providing a user with a realistic image service.

Aspects of the present disclosure are to address at least the above-mentioned problems and/or disadvantages and to provide at least the advantages described below. Accordingly, an aspect of the present disclosure is to provide an image processing method and an electronic device for providing an image service that is changed based on a movement of the electronic device.

Another aspect of the present disclosure is to provide an image processing method and an electronic device for providing a realistic virtual environment service.

In accordance with an aspect of the present disclosure, a method of an electronic device is provided. The method includes detecting a movement of the electronic device, and changing a scale of a displayed image based on the movement.

In accordance with another aspect of the present disclosure, a method of an electronic device is provided. The method includes detecting a movement of the electronic device, searching for image property information, stored in advance, based on the movement, and changing a displayed image with another image based on the image property information.

In accordance with another aspect of the present disclosure, an electronic device is provided. The electronic device includes a display module configured to display an image, a sensor module configured to detect a movement of the electronic device, and a processor configured to change the displayed image based on the movement.

An image processing method according to various embodiments of the present disclosure and an electronic device thereof may provide an image service that changes based on a movement of a user. An image processing method according to various embodiments of the present disclosure and an electronic device thereof may provide a realistic virtual environment service.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
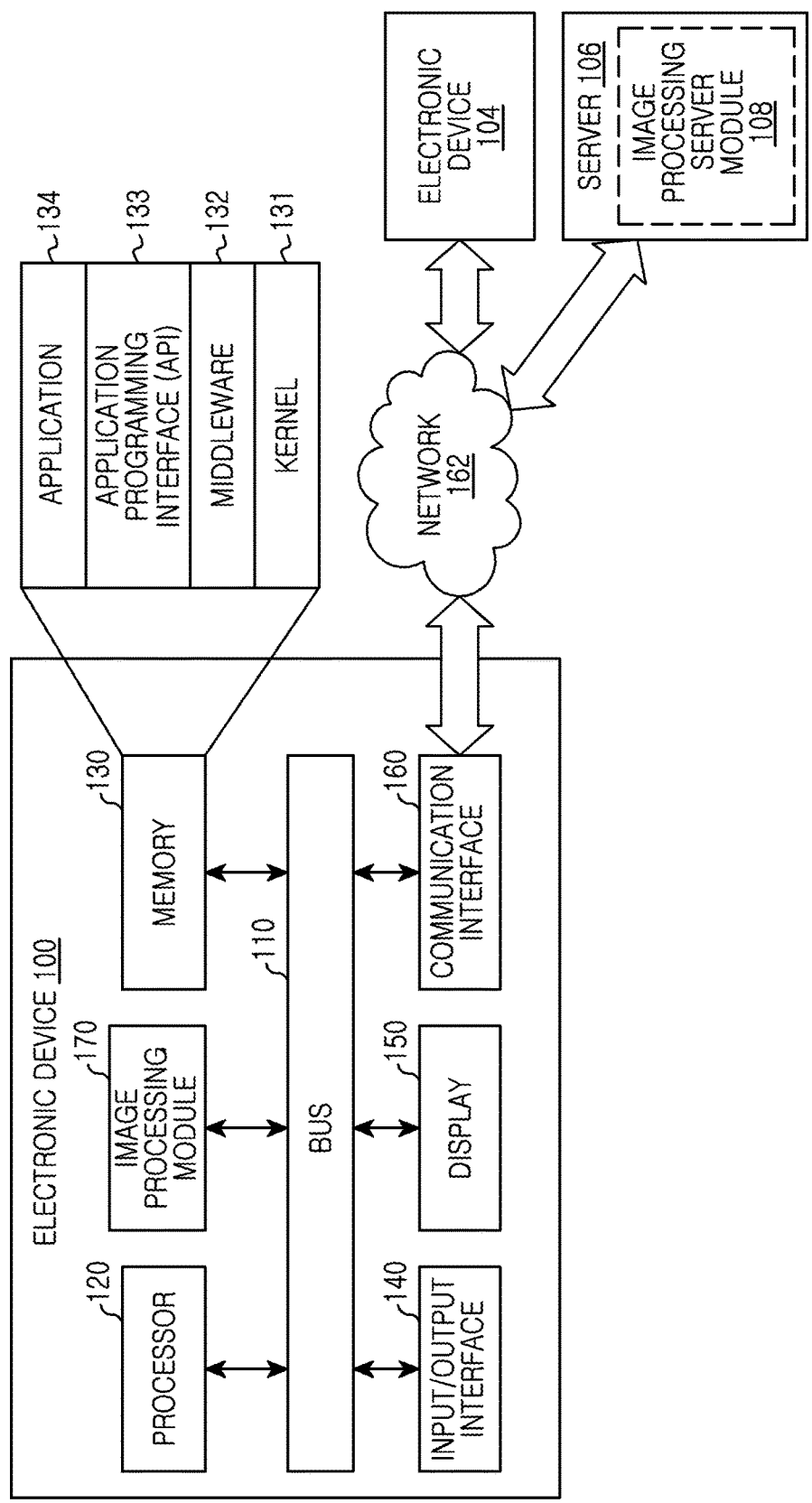
FIG. 1 is a block diagram of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "include" or "may include" refer to the existence of a corresponding disclosed function, operation or component which can be used in various embodiments of the present disclosure and do not limit one or more additional functions, operations, or components. Further, as used in embodiments of the present disclosure, the terms "include", "have" and their conjugates may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expressions "1", "2", "first", "second", or the like used in various embodiments of the present disclosure may modify various components of various embodiments but do not limit the corresponding components. For example, the above expressions do not limit the sequence and/or importance of the corresponding elements. The above expressions may be used merely for the purpose of distinguishing one element from the other elements. For example, a first electronic device and a second electronic device indicate different electronic devices although both of them are electronic devices. For example, without departing from the scope of the present disclosure, a first component element may be named a second component element. Similarly, the second component element also may be named the first component element.

When an element is referred to as being "coupled" or "connected" to any other element, it should be understood that not only the element may be directly coupled or connected to the other element, but also a third element may be interposed therebetween. Contrarily, when an element is referred to as being "directly coupled" or "directly connected" to any other element, it should be understood that no element is interposed therebetween.

In an embodiment of the present disclosure, the terms are used to describe a specific embodiment, and are not intended to limit the present disclosure.

Unless defined differently, all terms used herein, which include technical terminologies or scientific terminologies, have the same meaning as they would to a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to various embodiments of the present disclosure may be a device having a camera function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch.

According to various embodiments of the present disclosure, the electronic device may be a smart home appliance with a camera function. The smart home appliance as an example of the electronic device may include at least one of, for example, a television (TV), a Digital Video Disc (DVD) player, an audio system, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to various embodiments of the present disclosure, the electronic device may include at least one of various types of medical devices (for example, Magnetic Resonance Angiography (MRA), Magnetic Resonance Imaging (MRI), Computed Tomography (CT), a scanning machine, ultrasonic wave device, or the like), a navigation device, a Global Positioning System (GPS) receiver, an Event Data Recorder (EDR), a Flight Data Recorder (FDR), a car infotainment device, ship electronic equipment (for example, navigation equipment for a ship, a gyro compass, or the like), avionics, a security device, and an industrial or home robot.

According to various embodiments of the present disclosure, the electronic device may include at least one of furniture or a part of a building/structure, an electronic board, an electronic signature receiving device, a projector, and various types of measuring devices (for example, a water meter, an electricity meter, a gas meter, a radio wave meter, or the like) including a display control function.

An electronic device according to various embodiments of the present disclosure may be a combination of one or more of above described various devices. Also, an electronic device according to various embodiments of the present disclosure may be a flexible device. Also, an electronic device according to various embodiments of the present disclosure is not limited to the above described devices.

Hereinafter, an electronic device according to various embodiments of the present disclosure will be described with reference to the accompanying drawings. In various embodiments, the term "user" may indicate a person using an electronic device or a device (e.g. an artificial intelligence electronic device) using an electronic device.

FIG. 1 is a block diagram of an electronic device according to various embodiments of the present disclosure.

Referring to FIG. 1, an electronic device 100 may include a bus 110, a processor 120, a memory 130, an input/output interface 140, a display 150, a communication interface 160, and an image processing module 170. According to various embodiments of the present disclosure, the image processing module 170 may operate in the processor 120, or may be included in a separate module and interoperates with the processor 120. According to various embodiments of the present disclosure, the display 150 may be separated from the electronic device 100 as a separate module.

The bus 110 may be a circuit that interconnects the above-described component elements and delivers communications (for example, a control message) between the above-described component elements.

The processor 120 may receive an instruction from other component elements (for example, the memory 130, the input/output interface 140, the display 150, the communication interface 160, the image processing module 170, or the like), through the bus 110, may decrypt the received instruction, and may execute operation or data processing based on the decrypted instruction.

The memory 130 may store an instruction or data received from the processor 120 or other component elements (for example, the input/output interface 140, the display 150, the communication interface 160, the image processing module 170, or the like), or may store instruction or data generated by the processor 120 or other component elements.

The memory 130 may include programming modules, for example, a kernel 131, middleware 132, an Application Programming Interface (API) 133, an application 134, or the like. Each of the aforementioned programming modules may be formed of software, firmware, and hardware, or a combination of at least two thereof.

According to various embodiments of the present disclosure, the kernel 131 may control or manage system resources, for example, the bus 110, the processor 120, the memory 130, or the like, used for executing an operation or function implemented in other programming modules, for example, the middleware 132, the API 133, or the application 134. Also, the kernel 131 may provide an interface that enables the middleware 132, the API 133, or the application 134 to access an individual component element of the electronic device 100 for control or management.

According to various embodiments of the present disclosure, the middleware 132 may act as an intermediary so that the API 133 or the application 134 executes communication with the kernel 131, and receives and transmits data. Also, in association with task requests received from the application 134, the middleware 132 may execute a control (for example, scheduling or load balancing), for a task request, through use of a method of assigning, to at least one of applications 134, a priority of use of a system resource of the electronic device 100 (for example, the bus 110, the processor 120, the memory 130, or the like).

According to various embodiments of the present disclosure, the API 133 is an interface used by the application 134 to control a function provided from the kernel 131 or the middleware 132, and may include at least one interface or function (for example, an instruction), for file control, window control, image processing, a character control, or the like.

According to various embodiments of the present disclosure, the application 134 may include a Short Message Service (SMS)/Multimedia Messaging Service (MMS) application, an e-mail application, a calendar application, an alarm application, a health care application (for example, an application for measuring an amount of exercise or blood sugar), an environmental information application (for example, an application for providing atmospheric pressure, humidity information, temperature information), or the like. Additionally or alternatively, the application 134 may be an application associated with exchanging information between the electronic device 100 and an external electronic device (for example, an electronic device 104). The application associated with exchanging information may include, for example, a notification relay application for transferring predetermined information to an external electronic device or a device management application for managing an external electronic device.

For example, the notification relay application may include a function of transferring, to the external electronic device (for example, the electronic device 104), notification information generated from other applications of the electronic device 100 (for example, an SMS/MMS application, an e-mail application, a health management application, an environmental information application, or the like). Additionally or alternatively, the notification relay application may receive notification information from, for example, an external electronic device (for example, the electronic device 104), and may provide the notification information to a user. For example, the device management application may manage (for example, install, delete, or update) a function of at least a part of an external electronic device (for example, the electronic device 104) that communicates with the electronic device 100 (for example, turning on/off the external electronic device (or a few component) or adjusting brightness (or resolution) of a display), an application operated in the external electronic device, or a service provided from the external electronic device (for example, a call service or a message service).

According to various embodiments of the present disclosure, the application 134 may include an application designated based on properties (for example, a type of an electronic device) of an external electronic device (for example, the electronic device 104). For example, when the external electronic device is an MP3 player, the application 134 may include an application related to the reproduction of music. Similarly, when the external electronic device is a mobile medical device, the application 134 may include an application related to health care. According to various embodiments of the present disclosure, the application 134 may include at least one of an application received from an application designated for the electronic device 100 and an application received from an external electronic device (for example, a server 106 or the electronic device 104).

According to various embodiments of the present disclosure, the input/output interface 140 may transfer an instruction or data, which may be input by a user through input/output devices (for example, a sensor, a keyboard, or a touch screen), to the processor 120, the memory 130, the communication interface 160, or the image processing module 170 through, for example, the bus 110. For example, the input/output interface 140 may provide, to the processor 120, data associated with a touch of a user input through a touch screen. Further, the input/output interface 140 may output, through an input/output device (for example, a speaker or display), an instruction or data received, for example, through the bus 110 from the processor 120, the memory 130, the communication interface 160, and the image processing module 170. For example, the input/output interface 140 may output voice data processed through the processor 120 to a user through a speaker.

According to various embodiments of the present disclosure, the display 150 may display various pieces of information (for example, multimedia data, text data, or the like) for a user.

According to various embodiments of the present disclosure, the communication interface 160 may establish communication between the electronic device 100 and an electronic device (for example, the electronic device 104 or the server 106). For example, the communication interface 160 may be connected to a network 162 through wireless communication or wired communication, and may communicate with an external device. The wireless communication may include at least one of, for example, Wi-Fi, Bluetooth (BT), Near Field Communication (NFC), GPS, and cellular communication (for example, long term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), or the like). The wired communication may include at least one of, for example, a Universal Serial Bus (USB), a High Definition Multimedia Interface (HDMI), a Recommended Standard 232 (RS-232), and a Plain Old Telephone Service (POTS).

According to various embodiments of the present disclosure, the network 162 may be a telecommunication network. The telecommunication network may include at least one of a computer network, the Internet, an Internet of things, and a telephone network. According to various embodiments of the present disclosure, a protocol (for example, a transport layer protocol, a data link layer protocol, or a physical layer protocol) for the communication between the electronic device 100 and an external device may be supported by at least one of the application 134, the application programming interface 133, the middleware 132, the kernel 131, and the communication interface 160.

According to various embodiments of the present disclosure, the image processing module 170 may detect a movement of the electronic device 100 using at least one of an acceleration sensor, a gyro sensor, a geomagnetic sensor, and a tilt sensor. The image processing module 170 may change a scale of a displayed image, based on the detected movement. According to various embodiments of the present disclosure, the image processing module 170 searches for image property information stored in advance, based on the detected movement, and changes a displayed image with another image based on the retrieved image property information. For example, the image property information may be information obtained by grouping property information related to one another from among unique information associated with a plurality of images. The property information may include location information, height information, distance information of a point of view where an image is photographed, or the like.

According to various embodiments of the present disclosure, the server 106 may execute at least one of the operations (or functions) implemented in the electronic device 100, so as to support driving of the electronic device 100. For example, the server 106 may include an image processing server module 108 that may support the image processing module 170 embodied in the electronic device 100. According to various embodiments of the present disclosure, the image processing server module 108 may include at least one component element of the image processing module 170, and may execute at least one of the operations that the image processing module 170 executes (for example, may execute at least one of the operations for the image processing module 170).

According to various embodiments of the present disclosure, the image processing module 170 may process at least a part of information obtained from other component elements (for example, processor 120, memory 130, input/output interface 140, communication interface 160, or the like) and provide the processed information to a user in various ways. For example, the image processing module 170 may control at least some functions of the electronic device 100 by using the processor 120 or independently from the same, so that the electronic device 100 may interwork with other electronic devices (for example, the electronic device 104 or the server 106). According to various embodiments of the present disclosure, at least one component element of the image processing module 170 may be included in the server 106 (for example, the image processing server module 108), and at least one operation implemented in the image processing module 170 may be supported by the server 106.

An electronic device according to various embodiments of the present disclosure may include a display, at least one sensor, and a processor configured to control to: display a first image on the display, detect movement information of the electronic device using the at least one sensor while displaying the first image, determine property information of the first image according to the detected movement information of the electronic device, select a second image based on the determined property information, and display the selected second image on the display.

According to various embodiments of the present disclosure, the property information of the first image may include at least one of location information, height information, distance information of a point of view where the first image is photographed, and height information of an object in the first image.

According to various embodiments of the present disclosure, the movement information of the electronic device may include at least one of a movement acceleration, a movement distance, and a movement direction.

According to various embodiments of the present disclosure, the processor compares the property information of the first image with another property information of the second image, and determines an enlargement/reduction scale of the first image based on the comparing result.

According to various embodiments of the present disclosure, the property information may be information obtained by grouping property information related to one another from among unique information associated with a plurality of images.

According to various embodiments of the present disclosure, the processor groups the first image and the second image based on the property information.

According to various embodiments of the present disclosure, the processor changes at least one image included in the group based on the movement information, and changes at least one image that is not included in the group based on a predetermined input.

According to various embodiments of the present disclosure, the at least one sensor includes at least one of an acceleration sensor, a gyro sensor, a geomagnetic sensor, and a tilt sensor.

Figure 2:
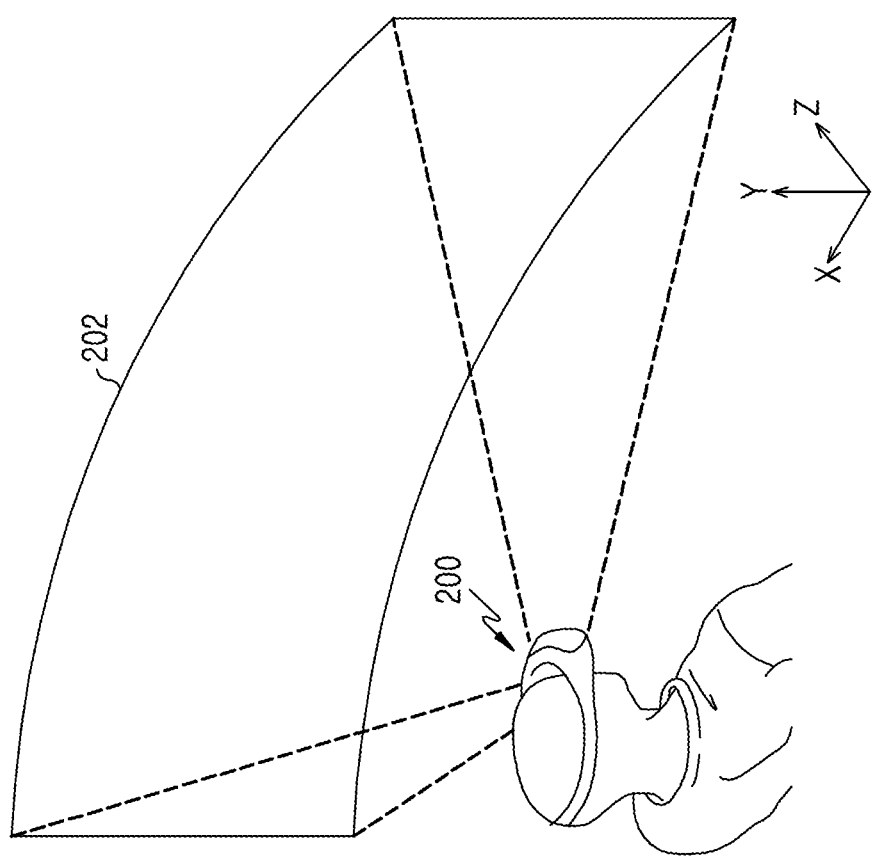
FIG. 2 is a diagram illustrating a configuration of a display screen for providing a virtual environment in an electronic device according to various embodiments of the present disclosure.

FIG. 2 is a diagram illustrating a configuration of a display screen for providing a virtual environment in an electronic device according to various embodiments of the present disclosure.

Referring to FIG. 2, an electronic device 200 may be a head mounted device that is settled (i.e., worn) on the head of a user. For example, the electronic device 200 may show a display screen to a user, and may divide a display screen into two parts and show a two dimensional (2D) screen or a three dimensional (3D) screen through each part. According to various embodiments of the present disclosure, the electronic device 200 may output data through a display. The data may be data associated with a virtual space. For example, the data may include a graphic image including text, a drawing, a picture, a video, or the like. According to various embodiments of the present disclosure, the data may include a background image based on a field of view of a user. For example, the data may be formed of a background image shown when a user rotates 360 degrees. According to various embodiments of the present disclosure, the electronic device 200 may display a part of the data in a display. The part of the data displayed in the display may be referred to as a display portion 202, and the corresponding display portion (screen) 202 may change based on a point of view or a movement of a user. According to various embodiments of the present disclosure, the display portion 202 may change based on an input module (for example, a touch screen, a key button, or the like).

Figure 3A:
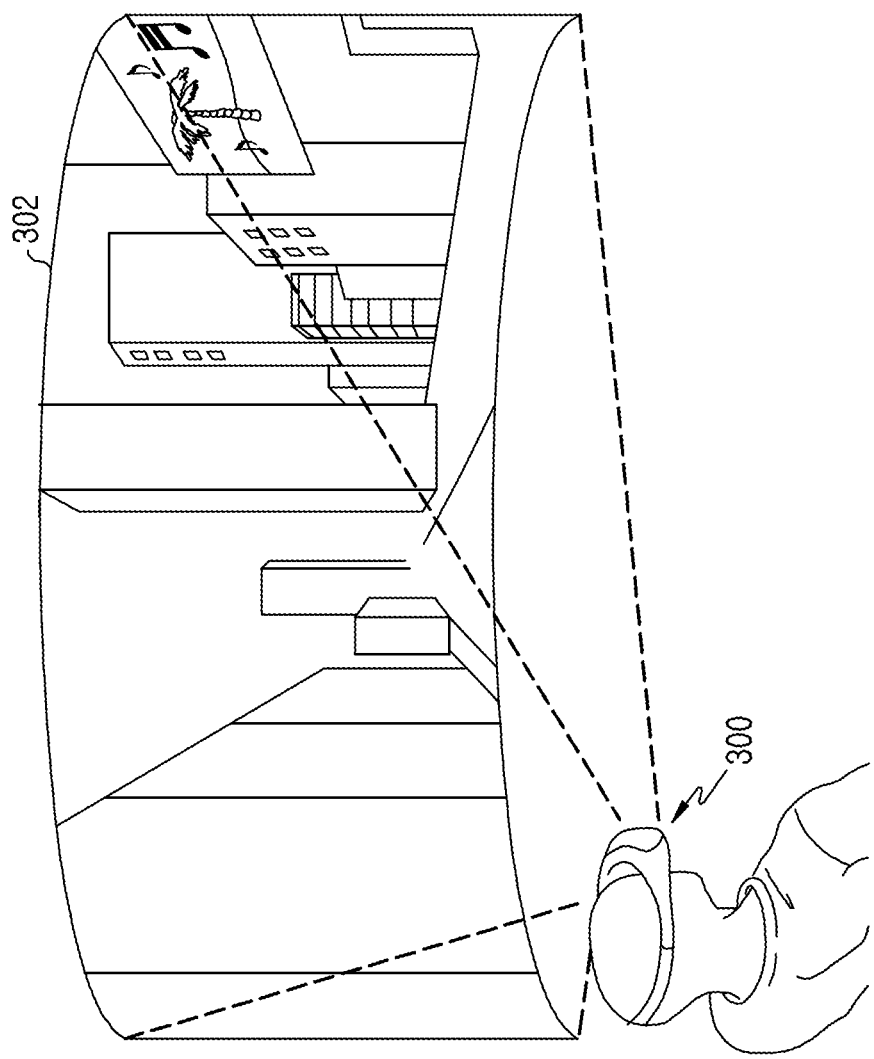
FIGS. 3A and 3B are diagrams illustrating configurations of a display screen for providing a virtual environment in an electronic device according to various embodiments of the present disclosure.
Figure 3B:
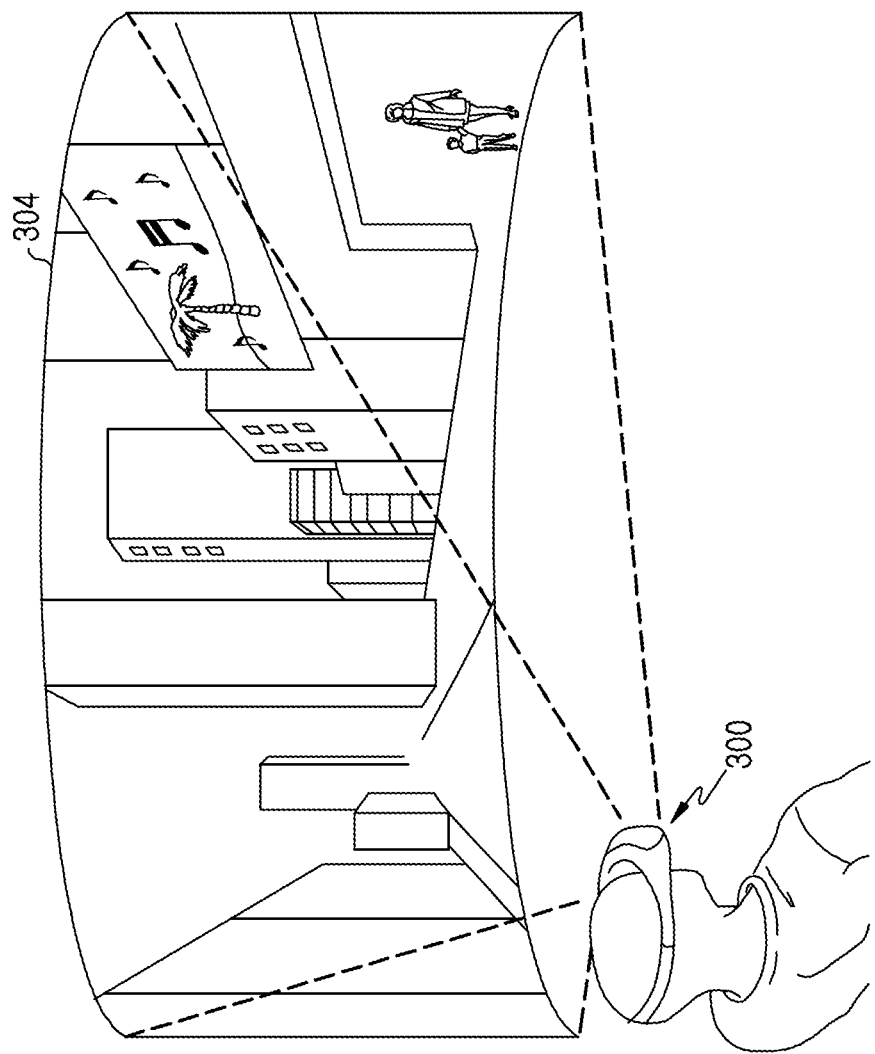

FIGS. 3A and 3B are diagrams illustrating configurations of a display screen for providing a virtual environment in an electronic device according to various embodiments of the present disclosure.

Referring to FIG. 3A, an electronic device 300 processes data (or an image) to be provided to a display, and provides a part of the data to a user. The data may include an image of a predetermined place or a background image based on a field of view of a user. According to various embodiments of the present disclosure, the electronic device 300 may display a part of an image that corresponds to a point of view of a user. According to various embodiments of the present disclosure, the electronic device 300 displays a second image 304 based on a movement of a user (for example, head tracking, or the like) as illustrated in FIG. 3B, in a state in which the first image 302 is displayed as illustrated in FIG. 3A. For example, the electronic device 300 detects a movement of a user (or detects an input through an input module), so as to determine whether to change the displayed first image 302, and outputs the second image 304 that is related to the first image 302. According to various embodiments of the present disclosure, the first image 302 and the second image 304 may be parts of an identical background image.

According to various embodiments of the present disclosure, the first image 302 and the second image 304 may include property information related to one another. For example, the property information may include location information, height information, distance information of a point of view where an image is photographed, or the like. Therefore, the location of an object (for example, a building, or the like) included in the first image 302 and the second image 304 may be changed, or the location of a point of view where a corresponding image has been photographed may be changed.

Figure 4:
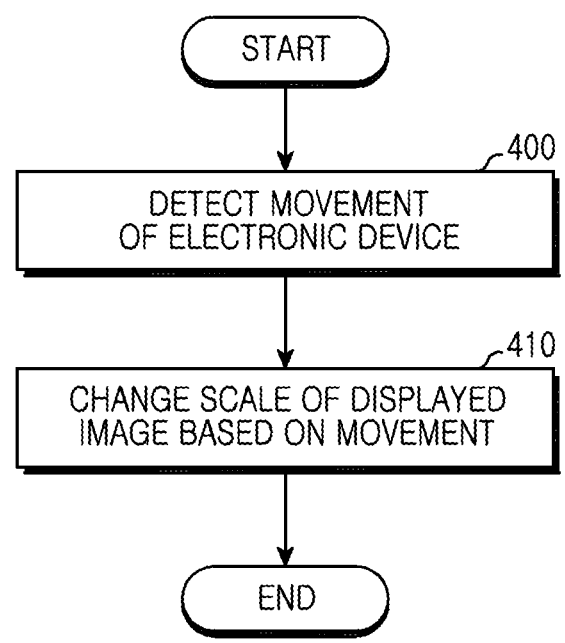
FIG. 4 is a diagram illustrating a process for changing a scale of a displayed image based on a movement of an electronic device according to various embodiments of the present disclosure.

FIG. 4 is a diagram illustrating a process for changing a scale of a displayed image based on a movement of an electronic device according to various embodiments of the present disclosure.

Referring to FIG. 4, an electronic device detects a movement of the electronic device in operation 400. The electronic device may be a device that is mounted on a body part of a user. According to various embodiments of the present disclosure, the electronic device may obtain movement information using at least one sensor. For example, the electronic device may recognize a degree of movement using at least one of an acceleration sensor, a gyro sensor, a geomagnetic sensor, and a tilt sensor.

FIGS. 5A, 5B, 5C, and 5D are diagrams illustrating a method of detecting a movement of an electronic device according to various embodiments of the present disclosure.

Figure 5A:
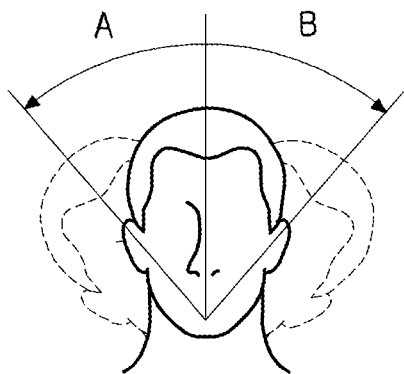
FIGS. 5A, 5B, 5C, and 5D are diagrams illustrating a method of detecting a movement of an electronic device according to various embodiments of the present disclosure.
Figure 5B:
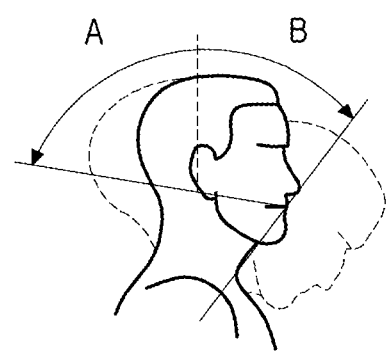
Figure 5C:
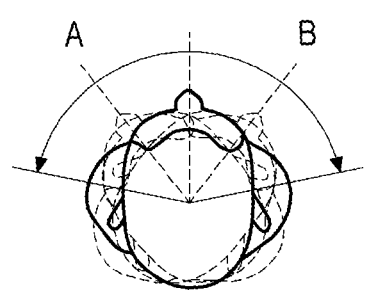
Figure 5D:
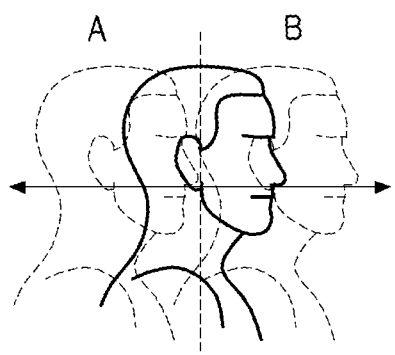

Referring to FIGS. 5A-5D, the electronic device may detect a motion of moving the center of a face to the left/right as illustrated in FIG. 5A, a motion of moving the center of a face back/forth as illustrated in FIG. 5B, a motion of changing the direction of a face to the left/right as illustrated in FIG. 5C, and a motion of changing the location of a face back/forth as illustrated in FIG. 5D.

The electronic device may change the scale of a displayed image, based on the detected movement in operation 410. According to various embodiments of the present disclosure, when a movement of a user's body that inclines is detected, the electronic device may determine the movement as a movement of a body closer to the ground or a movement of a body forward.

Figure 6A:
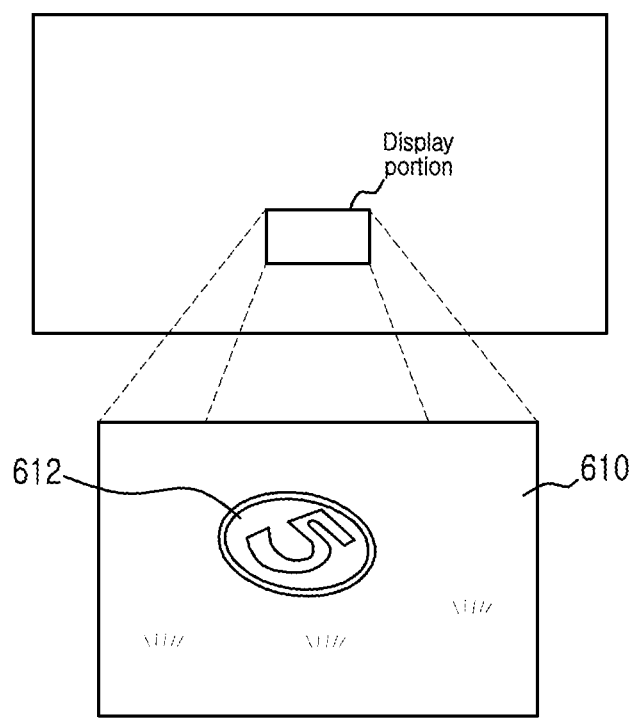
FIGS. 6A and 6B are diagrams illustrating configurations of a screen for changing a scale of a displayed image based on a movement of an electronic device according to various embodiments of the present disclosure.
Figure 6B:
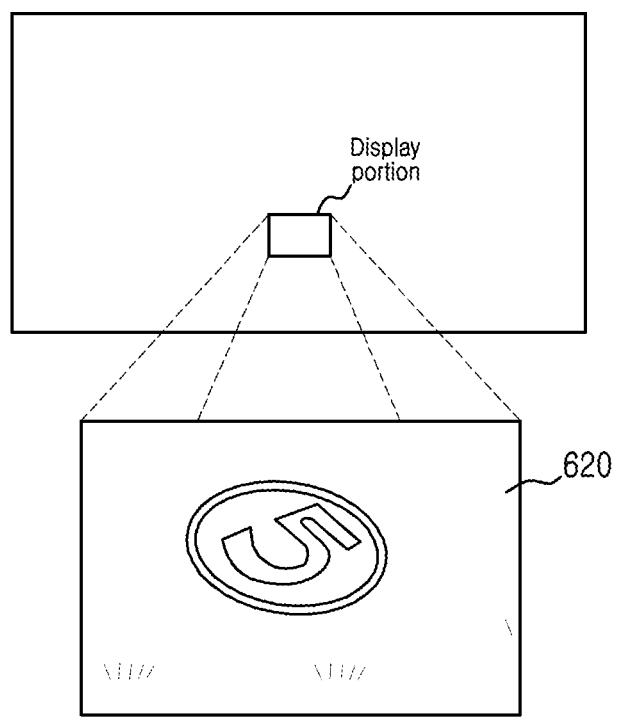

FIGS. 6A and 6B are diagrams illustrating configurations of a screen for changing a scale of a displayed image based on a movement of an electronic device according to various embodiments of the present disclosure.

Referring to FIGS. 6A and 6B, the electronic device may determine a movement of a body closer to the ground or a movement of a body forward, may enlarge the scale of an image 610 currently displayed, and display an enlarged image 620. In this instance, it may seem to the user as though the user approaches an object 612 of the image 610 in the direction of the object 612, based on the movement, even in a virtual environment. According to various embodiments of the present disclosure, the electronic device may determine a movement of a body away from the ground, reduce the scale of a currently displayed image, and display a reduced image. According to various embodiments of the present disclosure, the electronic device may adjust the scale of an image to be displayed based on distance information associated with a distance to the ground, but the disclosure is not limited thereto. For example, the electronic device may adjust the scale of an image to be displayed using distance information associated with a distance to a predetermined building, height information associated with a height to a ceiling, information associated with a height of an object included in an image, or the like.

According to various embodiments of the present disclosure, the electronic device may adjust an image enlargement/reduction scale associated with a movement, based on image property information. For example, the property information may include location information, height information, distance information of a point of view where an image is photographed, height information of an object included in an image, or the like. According to various embodiments of the present disclosure, the electronic device compares obtained movement information and property information associated with a currently displayed image, so as to set an image enlargement/reduction scale. According to various embodiments of the present disclosure, the electronic device may set an image enlargement/reduction scale, based on an acceleration variation, a distance variation, an angular velocity variation associated with a detected movement, or the like.

Figure 7:
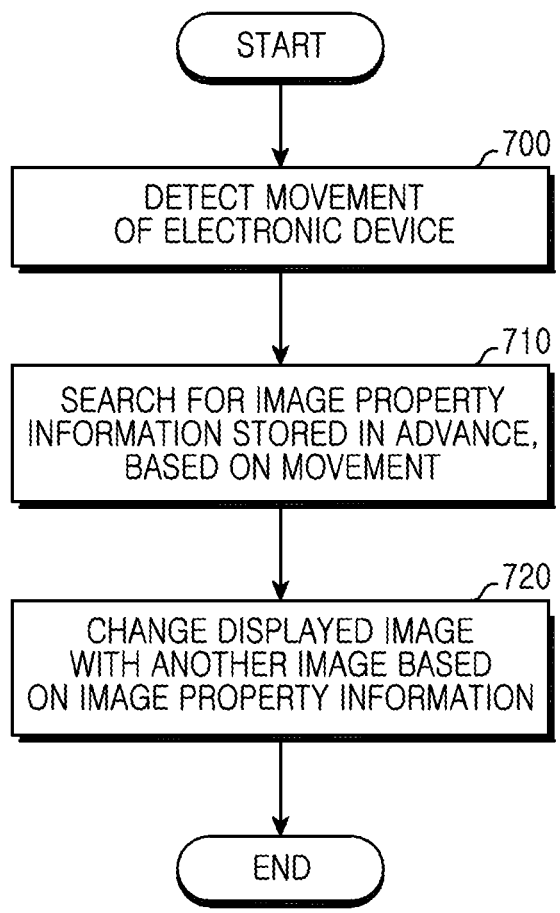
FIG. 7 is a diagram illustrating a process for changing a displayed image with another image based on a movement of an electronic device according to various embodiments of the present disclosure.

FIG. 7 is a diagram illustrating a process for changing a displayed image with another image based on a movement of an electronic device according to various embodiments of the present disclosure.

Referring to FIG. 7, an electronic device detects a movement of the electronic device in operation 700. The electronic device may be a device that is mounted on a body part of a user. According to various embodiments of the present disclosure, the electronic device may obtain movement information using at least one sensor. For example, the electronic device may recognize a degree of movement using at least one of an acceleration sensor, a gyro sensor, a geomagnetic sensor, a tilt sensor, or the like. According to various embodiments of the present disclosure, the electronic device may detect a motion of moving the center of a face to the left/right as illustrated in FIG. 5A, a motion of moving the center of a face back/forth as illustrated in FIG. 5B, a motion of changing the direction of a face to the left/right as illustrated in FIG. 5C, and a motion of changing the location of a face back/forth as illustrated in FIG. 5D.

The electronic device may search for image property information stored in advance, based on the detected movement, in operation 710. For example, the image property information may be information obtained by grouping property information related to one another from among unique information associated with a plurality of images.

Figure 8:
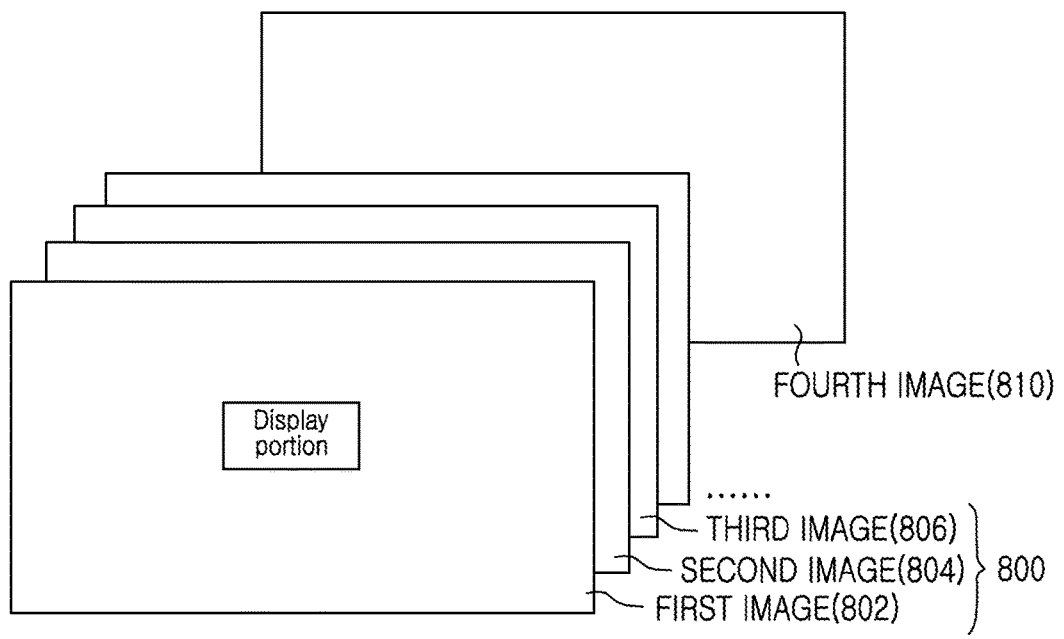
FIG. 8 illustrates a method of grouping a plurality of images based on a predetermined criterion according to various embodiments of the present disclosure.

FIG. 8 illustrates a method of grouping a plurality of images based on a predetermined criterion according to various embodiments of the present disclosure.

Referring to FIG. 8, an electronic device may include a plurality of images 802, 804, 806, 810, or the like. According to various embodiments of the present disclosure, the plurality of images 802, 804, 806, 810, or the like may be designated as at least one group 800, based on a predetermined criterion. According to various embodiments of the present disclosure, the first image 802, the second image 804, and the third image 806 may be included in the single group 800. According to various embodiments of the present disclosure, the fourth image 810 may be included in a group that is different from the group 800 where the first image 802, the second image 804, and the third image 806 are included. For example, the images 802, 804, 806, or the like included in the group 800 may be images that are frequently changed and displayed in a display. The images 802, 804, 806, or the like included in the group 800 may be changed and edited. According to various embodiments of the present disclosure, property information of the images 802, 804, 806, or the like included in the group 800 may be associated with one another, or may be identical to one another. For example, the property information may include location information, height information, distance information of a point of view where an image is photographed, height information of an object included in an image, or the like.

According to various embodiments of the present disclosure, the property information may be distance information associated with a distance to a predetermined object, and at least one image may be grouped based on a degree of proximity of distance information. For example, in the case of distance information, the first image 802 may be an image having a distance close to the second image 804, and the third image 806 may be an image having a distance distant from the first image 802. According to various embodiments of the present disclosure, the property information may include information associated with a chronological sequence of a corresponding image based on a time when the image is photographed. For example, in the case of a chronological sequence, the first image 802 may be an image that is photographed close to when the second image 804 is photographed, and the third image 806 may be an image that is photographed distant from when the first image 802 is photographed. According to various embodiments of the present disclosure, the property information may include information associated with a motion line generated while a corresponding image is photographed. However, the disclosure is not limited thereto, and the image property information may include various information such as a size, a name, a type, date of creation of an image, or the like.

The electronic device may change the displayed image with another image based on the image property information, in operation 720. According to various embodiments of the present disclosure, when a movement of a user's body that inclines is detected, the electronic device may determine the movement as a movement of a body closer to the ground or a movement of a body forward.

Figure 9A:
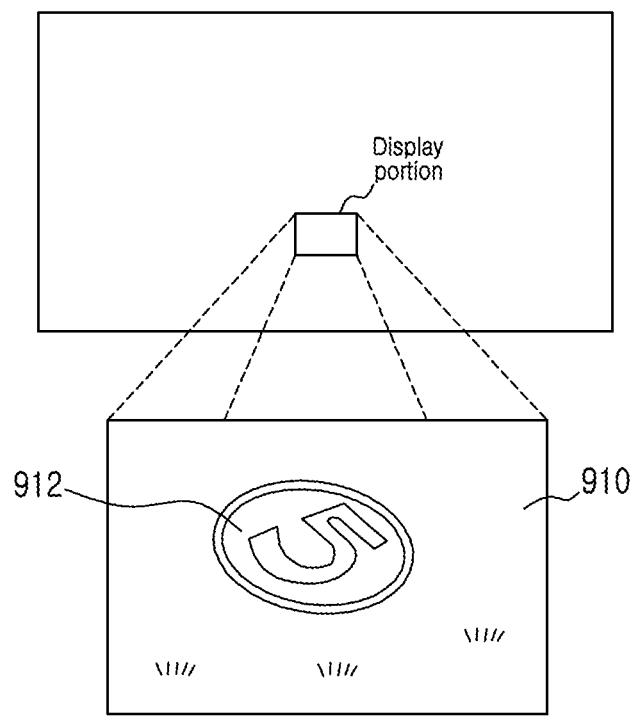
FIGS. 9A and 9B are diagrams illustrating configurations of a screen for changing a displayed image with another image based on a movement of an electronic device according to various embodiments of the present disclosure.
Figure 9B:
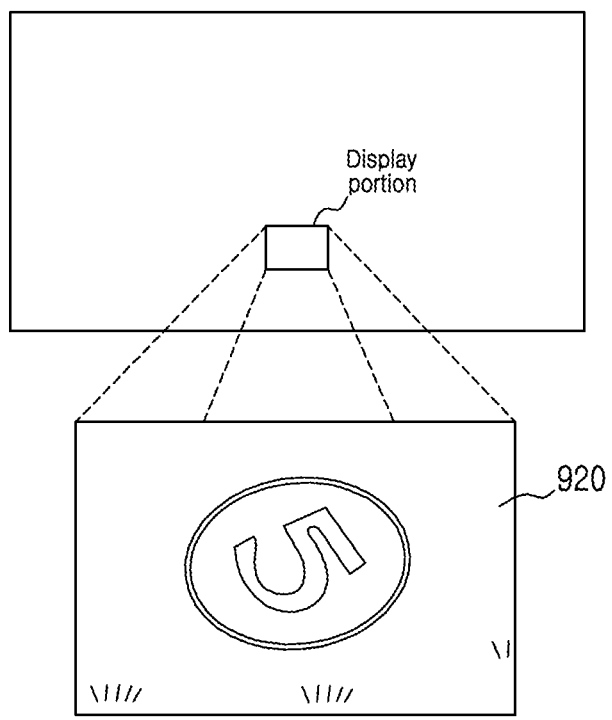

FIGS. 9A and 9B are diagrams illustrating configurations of a screen for changing a displayed image with another image based on a movement of an electronic device according to various embodiments of the present disclosure.

Referring to FIGS. 9A and 9B, the electronic device may determine a movement of a body closer to the ground or a movement of a body forward, and may change a currently displayed image 910 with another image 920. For example, the other image 920 may be one of the images included in a group in which the currently displayed image 910 is included. According to various embodiments of the present disclosure, the electronic device may provide, based on the detected movement, a user with an experience as though the user views an object 912 of the image 910 from a different angle.

According to various embodiments of the present disclosure, the electronic device may set, to be different, an image to be displayed through change, based on the detected movement. For example, when the distance of the detected movement is within a reference distance, the electronic device may display an image that is at a distance close to a currently displayed image. In addition, when the distance of the detected movement exceeds the reference distance, the electronic device may display an image that is at a distance distant from the currently displayed image.

As another example, when the distance of the detected movement is within the reference distance, the electronic device may display an image that is photographed close to when the currently displayed image is photographed. In addition, when the distance of the detected movement exceeds the reference distance, the electronic device may display an image that is photographed distant from when the currently displayed image is photographed.

According to various embodiments of the present disclosure, when the current image is changed with an image that is at a distance close to the currently displayed image, the electronic device may execute the change based on the movement information, and when the currently displayed image is changed with an image that is at a distance distant from the currently displayed image, the electronic device may execute the change based on information input through an input module. However, the disclosure is not limited thereto, and the electronic device may set, to be different, an image to be displayed through the change, based on an acceleration of a detected movement, a movement distance, or a movement direction.

According to various embodiments of the present disclosure, the electronic device may change at least one image included in a group grouped based on the above described scheme, based on a detected movement, and may change at least one image that is not included in the group based on a predetermined input. According to various embodiments of the present disclosure, the electronic device may change the displayed image 910 with another image 920. The electronic device may determine the image 920 by reflecting a display state of the image 910, when executing the change. For example, the electronic device detects a movement of a body closer to the ground or a movement of a body forward, and may change the enlarged image 910 with another image 920 based on the detection. According to various embodiments of the present disclosure, when the electronic device changes, with the other image 920, the displayed image 910 that is enlarged, the electronic device reflects the state of the image 910 before being changed, and displays the other image 920.

Figure 10:
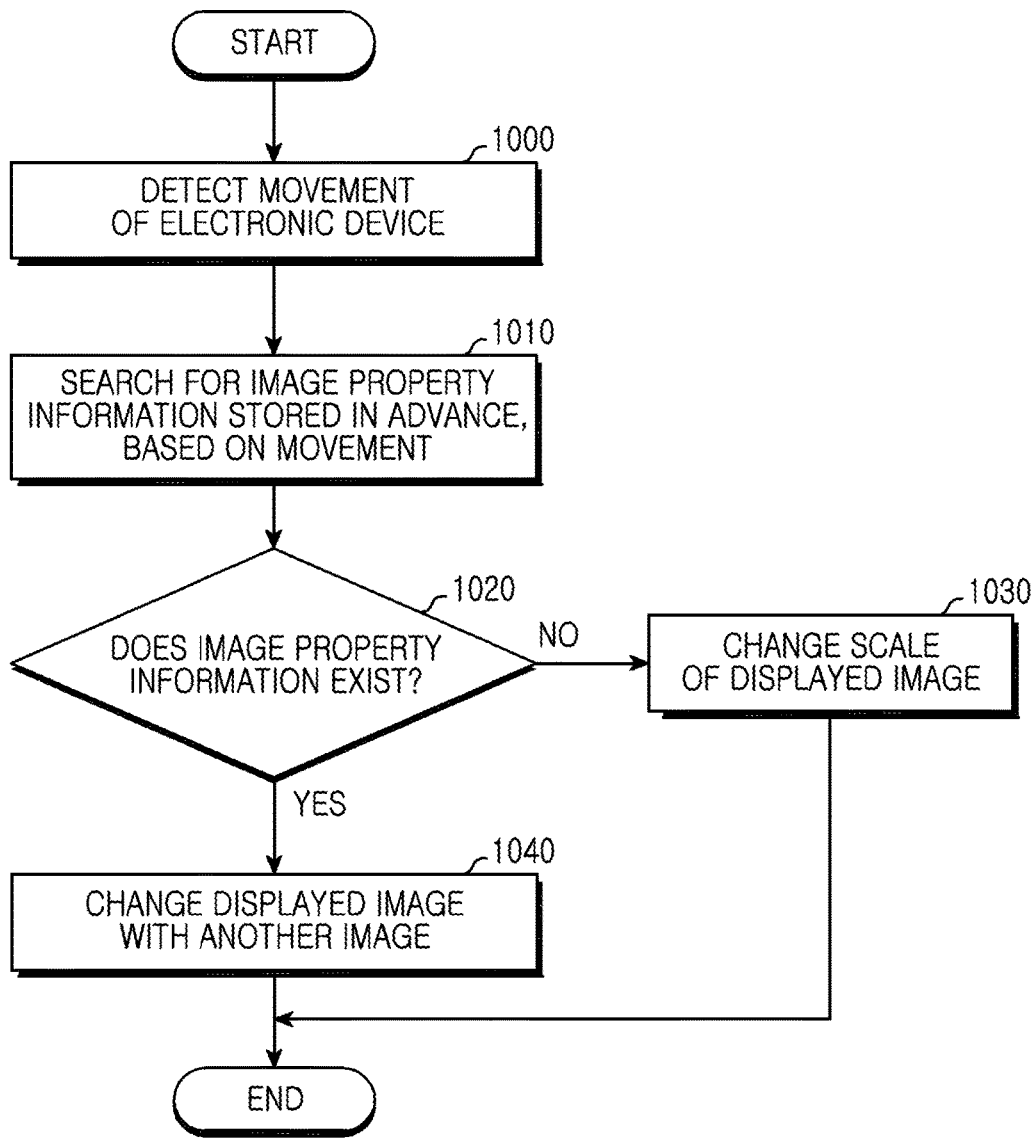
FIG. 10 is a diagram illustrating a process for changing a displayed image based on a movement of an electronic device according to various embodiments of the present disclosure.

FIG. 10 is a diagram illustrating a process for changing a displayed image based on a movement of an electronic device according to various embodiments of the present disclosure.

Referring to FIG. 10, an electronic device detects a movement of the electronic device in operation 1000. The electronic device may be a device that is mounted (e.g., worn) on a body part of a user. According to various embodiments of the present disclosure, the electronic device may obtain movement information using at least one sensor. For example, the electronic device may recognize a degree of movement using at least one of an acceleration sensor, a gyro sensor, a geomagnetic sensor, a tilt sensor, or the like. According to various embodiments of the present disclosure, the electronic device may detect a motion of moving the center of a face to the left/right as illustrated in FIG. 5A, a motion of moving the center of a face back/forth as illustrated in FIG. 5B, a motion of changing the direction of a face to the left/right as illustrated in FIG. 5C, and a motion of changing the location of a face back/forth as illustrated in FIG. 5D.

The electronic device may search for image property information stored in advance, based on the detected movement, in operation 1010. For example, the image property information may be information obtained by grouping property information related to one another from among unique information associated with a plurality of images. According to various embodiments of the present disclosure, an electronic device may include a plurality of images 802, 804, 806, 810, or the like, as illustrated in FIG. 8. According to various embodiments of the present disclosure, the plurality of images 802, 804, 806, and 810 may be designated as at least one group 800, based on a predetermined criterion. According to various embodiments of the present disclosure, the first image 802, the second image 804, and the third image 806 are included in the single group 800. According to various embodiments of the present disclosure, the fourth image 810 may be included in a group that is different from the group 800 where the first image 802, the second image 804, and the third image 806 are included. For example, the images 802, 804, 806, or the like included in the group 800 may be images that are frequently changed and displayed in a display. The images 802, 804, 806, or the like included in the group 800 may be changed and edited. According to various embodiments of the present disclosure, property information of the images 802, 804, 806, or the like included in the group 800 may be associated with one another, or may be identical to one another. For example, the property information may include location information, height information, distance information of a point of view where an image is photographed, and height information of an object in an image, or the like.

According to various embodiments of the present disclosure, the property information may be information associated with a distance to a predetermined object, and at least one image may be grouped based on a degree of proximity of distance information. For example, in the case of distance information, the first image 802 may be an image having a distance close to the second image 804, and the third image 806 may be an image having a distance distant from the first image 802. According to various embodiments of the present disclosure, the property information may include information associated with a chronological sequence of a corresponding image based on a time when the image is photographed. For example, in the case of a chronological sequence, the first image 802 may be an image that is photographed close to when the second image 804 is photographed, and the third image 806 may be an image that is photographed distant from when the first image 802 is photographed. According to various embodiments of the present disclosure, the property information may include information associated with a motion line generated while a corresponding image is photographed. However, the disclosure is not limited thereto, and the image property information may include various information such as a size, a name, a type, date of creation of an image, or the like.

The electronic device may determine whether image property information exists in operation 1020. According to various embodiments of the present disclosure, the electronic device may determine a group image corresponding to the detected movement information.

When the image property information does not exist, the electronic device may change a scale of the displayed image in operation 1030. According to various embodiments of the present disclosure, when a movement of a user's body that inclines is detected, the electronic device may determine the movement as a movement of a body closer to the ground or a movement of a body forward.

Figure 11A:
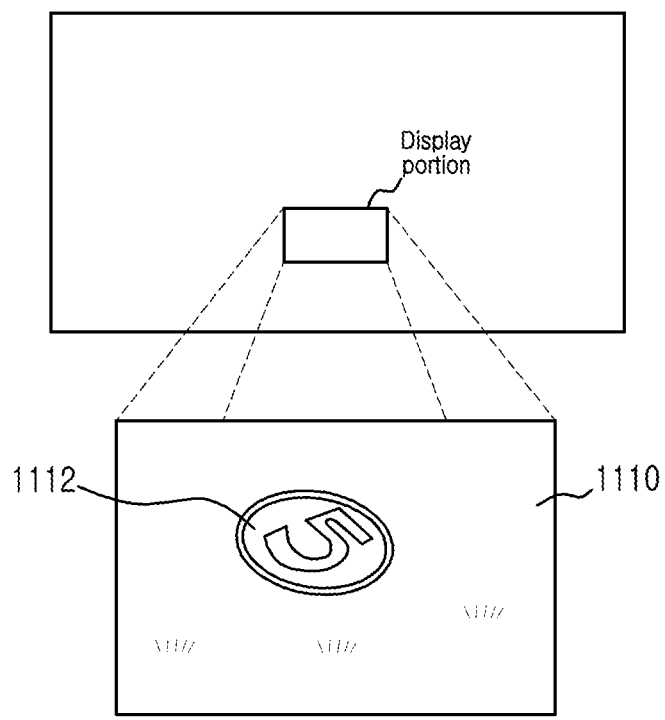
FIGS. 11A, 11B, and 11C are diagrams illustrating configurations of a screen for changing a displayed image based on a movement of an electronic device according to various embodiments of the present disclosure.
Figure 11B:
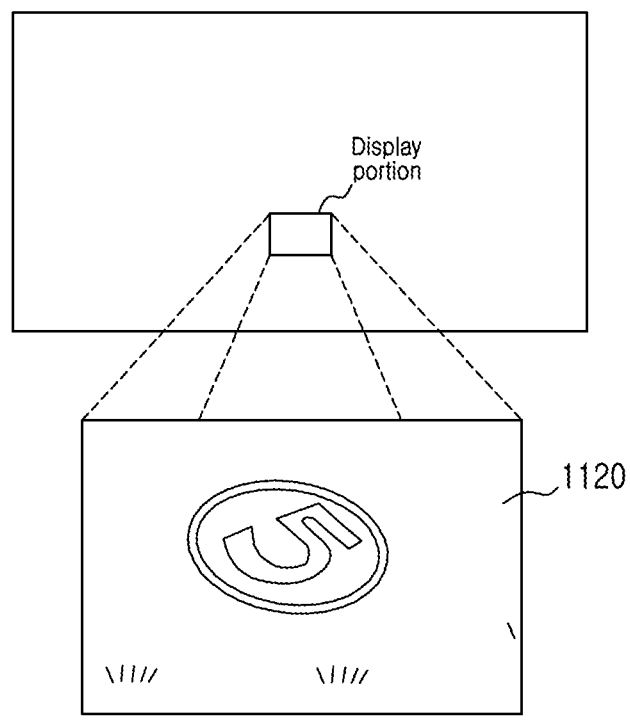
Figure 11C:
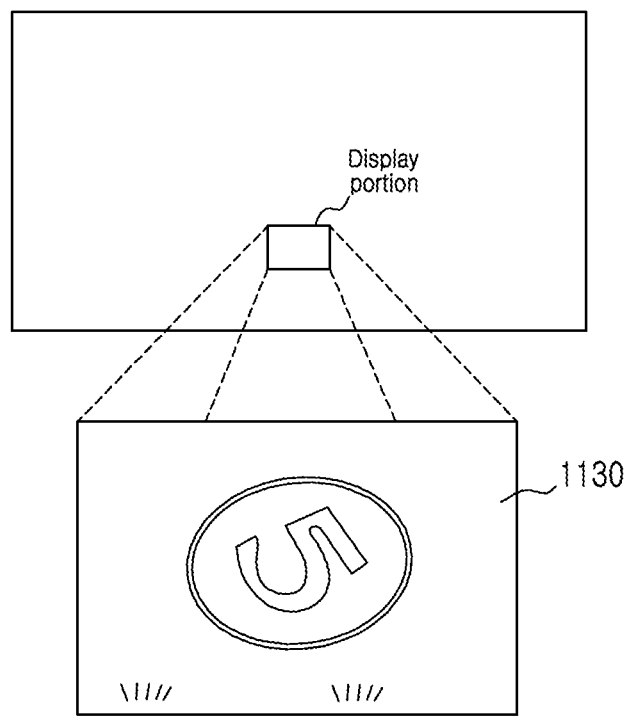

FIGS. 11A, 11B, and 11C are diagrams illustrating configurations of a screen for changing a displayed image based on a movement of an electronic device according to various embodiments of the present disclosure.

Referring to FIGS. 11A and 11B, the electronic device may determine a movement of a body closer to the ground or a movement of a body forward, may enlarge the scale of an image 1110 currently displayed, and display an enlarged image 1120. In this instance, it may seem to the user as though the user approaches an object 1112 of the image 1110 in the direction of the object 1112, based on the movement, even in a virtual environment. According to various embodiments of the present disclosure, the electronic device may determine a movement of a body away from the ground, reduce the scale of the currently displayed image and display a reduced image. According to various embodiments of the present disclosure, the electronic device may adjust the scale of an image to be displayed based on distance information associated with a distance to the ground but the disclosure is not limited thereto. For example, the electronic device may display the scale of an image to be displayed using distance information associated with a distance to a predetermined building, height information associated with a height to a ceiling, information associated with the height of an object included in an image, or the like.

According to various embodiments of the present disclosure, the electronic device may adjust an image enlargement/reduction scale associated with a movement, based on image property information. For example, the property information may include location information, height information, distance information of a point of view where an image is photographed, height information of an object in an image, or the like. According to various embodiments of the present disclosure, the electronic device compares obtained movement information and property information associated with a currently displayed image, so as to set an image enlargement/reduction scale. According to various embodiments of the present disclosure, the electronic device may set an image enlargement/reduction scale based on an acceleration variation, a distance variation, or an angular velocity variation associated with a detected movement.

When the image property information exists, the electronic device may change the displayed image with another image in operation 1040. According to various embodiments of the present disclosure, when a movement of a user's body that inclines is detected, the electronic device may determine the movement as a movement of a body closer to the ground or a movement of a body forward.

Referring to FIGS. 11A and 11C, the electronic device may determine a movement of a body closer to the ground or a movement of a body forward, and may change a currently displayed image 1110 with another image 1130. For example, the other image 1130 may be one of the images included in a group in which the currently displayed image 1110 is included. According to various embodiments of the present disclosure, the electronic device may provide, based on the detected movement, a user with an experience as though the user views the object 1112 of the image 1110 from a different angle.

According to various embodiments of the present disclosure, the electronic device may set an image to be displayed through change, to be different, based on the detected movement. For example, when a distance of the detected movement is within a reference distance, the electronic device may display an image that is at a distance close to a currently displayed image. In addition, when a distance of the detected movement exceeds the reference distance, the electronic device may display an image that is at a distance distant from the currently displayed image.

As another example, when the distance of the detected movement is within the reference distance, the electronic device may display an image that is photographed close to when the currently displayed image is photographed. In addition, when the distance of the detected movement exceeds the reference distance, the electronic device may display an image that is photographed distant from when the currently displayed image is photographed.

According to various embodiments of the present disclosure, when the current image is changed with an image that is at a distance close to the currently displayed image, the electronic device may execute the change based on the movement information, and when the currently displayed image is changed with an image that is at a distance distant from the currently displayed image, the electronic device may execute the change based on information input through an input module. However, the disclosure is not limited thereto, and the electronic device may set, to be different, an image to be displayed through the change, based on an acceleration of a detected movement, a movement distance, or a movement direction.

According to various embodiments of the present disclosure, the electronic device may change the displayed image 1110 with another image 1130. The electronic device may determine the other image 1130 by reflecting a display state of the image 1110, when executing the change. For example, the electronic device detects a movement of a body closer to the ground or a movement of a body forward, and may change the enlarged image 1110 with another image 1130 based on the detection. According to various embodiments of the present disclosure, when the electronic device changes the displayed image 1110 that is enlarged with the other image 1130, the electronic device reflects the state of the image 1110 before being changed, and displays the other image 1130.

The operation method of the electronic device according to various embodiments of the present disclosure may include displaying a first image on a display of the electronic device, detecting movement information of the electronic device using at least one sensor of the electronic device while displaying the first image, determining property information of the first image according to the detected movement information of the electronic device, selecting a second image based on the determined property information, and displaying the selected second image on the display of the electronic device.

According to various embodiments of the present disclosure, the property information of the first image may include at least one of location information, height information, distance information of a point of view where the first image is photographed, and height information of an object in the first image.

According to various embodiments of the present disclosure, the movement information of the electronic device may include at least one of an movement acceleration, a movement distance, and a movement direction.

According to various embodiments of the present disclosure, selecting the second image based on the determined property information may include comparing the property information of the first image with another property information of the second image, and determining an enlargement/reduction scale of the first image based on the comparing result.

According to various embodiments of the present disclosure, the property information may be information obtained by grouping property information related to one another from among unique information associated with a plurality of images.

According to various embodiments of the present disclosure, the first image and the second image may be grouped based on the property information.

According to various embodiments of the present disclosure, at least one image included in the group may be changed based on the movement information, and at least one image that is not included in the group may be changed based on a predetermined input.

According to various embodiments of the present disclosure, the at least one sensor may include at least one of an acceleration sensor, a gyro sensor, a geomagnetic sensor, and a tilt sensor.

Figure 12:
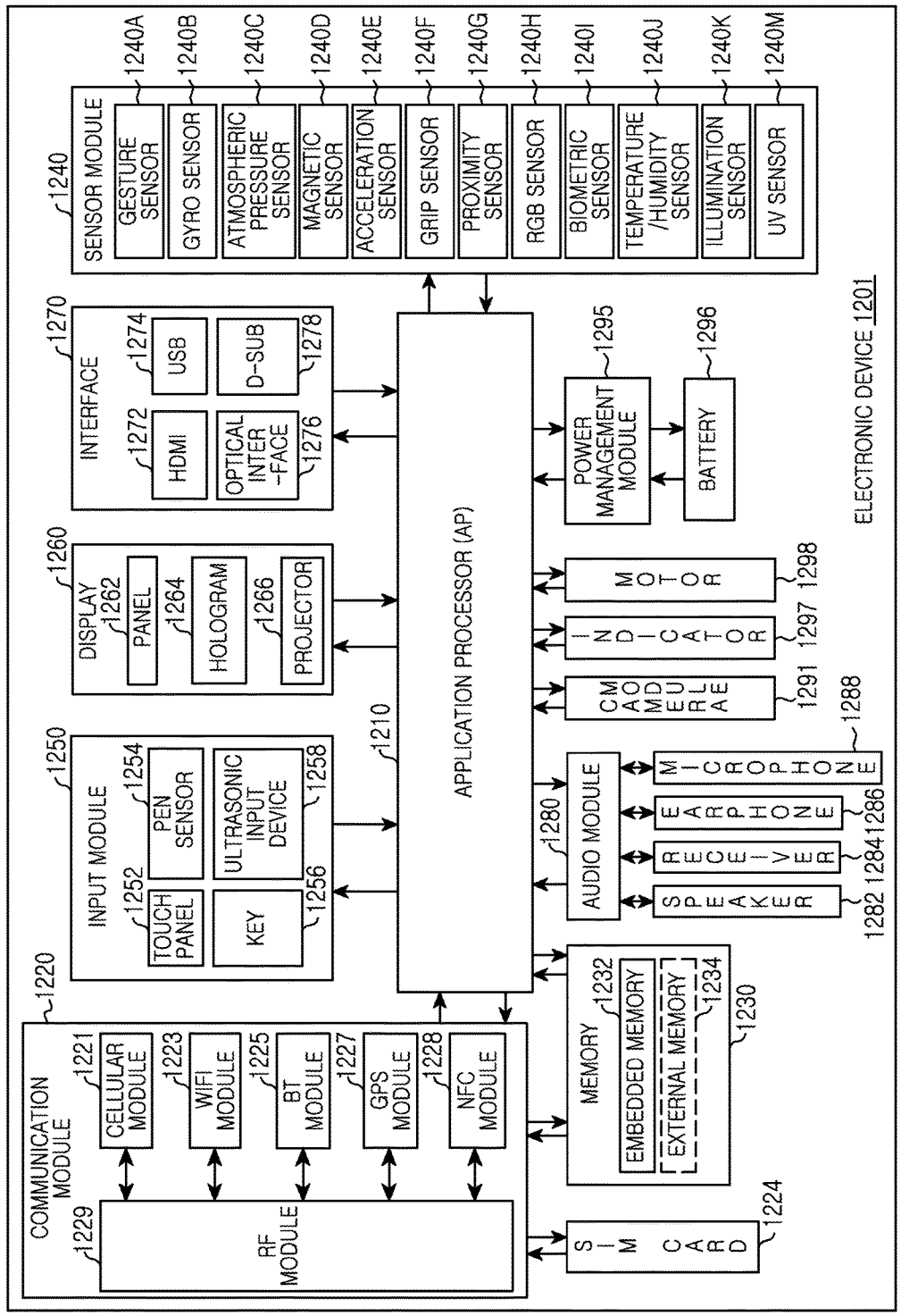
FIG. 12 is a block diagram of an electronic device according to various embodiments of the present disclosure.

FIG. 12 is a block diagram of an electronic device according to various embodiments of the present disclosure. An electronic device 1201 may form, for example, a part or the entirety of the electronic device 100 illustrated in FIG. 1.

Referring to FIG. 12, the electronic device 1201 may include at least one Application Processor (AP) 1210, a communication module 1220, a Subscriber Identifier Module (SIM) card 1224, a memory 1230, a sensor module 1240, an input device 1250, a display 1260, an interface 1270, an audio module 1280, a camera module 1291, a power management module 1295, a battery 1296, an indicator 1297, and a motor 1298.

The AP 1210 may control a plurality of hardware or software component elements connected to the AP 1210 by driving an operating system or an application program, and perform processing of various pieces of data including multimedia data and calculations. The AP 1210 may be implemented as, for example, a System on Chip (SoC). According to various embodiments of the present disclosure, the AP 1210 may further include a Graphic Processing Unit (GPU) (not illustrated).

The communication module 1220 may perform data transmission/reception in communication between the electronic device 1201 (for example, the electronic device 100) and other electronic devices (for example, the electronic device 104 or the server 106) connected to electronic device 1201 through a network. According to various embodiments of the present disclosure, the communication module 1220 may include a cellular module 1221, a Wi-Fi module 1223, a BT module 1225, a GPS module 1227, an NFC module 1228, and a Radio Frequency (RF) module 1229.

The cellular module 1221 may provide a voice call, a video call, a SMS, or an Internet service through a communication network (for example, LTE, LTE-A, CDMA, WCDMA, UMTS, WiBro, or GSM). Furthermore, the cellular module 1221 may identify and authenticate electronic devices within a communication network using, for example, a SIM (for example, the SIM card 1224). According to various embodiments of the present disclosure, the cellular module 1221 may perform at least some functions that the AP 1210 may provide. For example, the cellular module 1221 may perform at least some of the multimedia control functions.

According to various embodiments of the present disclosure, the cellular module 1221 may include a communication processor (CP). Furthermore, the cellular module 1221 may be implemented as, for example, an SoC. Although FIG. 12 illustrates the component elements, such as the cellular module 1221 (for example, a CP), the memory 1230, the power management module 1295, or the like, as component elements separate from the AP 1210, the AP 1210 may include at least some of the aforementioned component elements (for example, the cellular module 1221) according to various embodiments of the present disclosure.

According to various embodiments of the present disclosure, the AP 1210 or the cellular module 1221 (for example, a CP) may load, into a volatile memory, an instruction or data received from at least one of a non-volatile memory and other component elements connected thereto and process the same. Furthermore, the AP 1210 or the cellular module 1221 may store, in a non-volatile memory, data received from or generated by at least one of other component elements.

The Wi-Fi module 1223, the BT module 1225, the GPS module 1227, and the NFC module 1228 may include, for example, a processor for processing data transmitted/received through a corresponding module. In FIG. 12, the cellular module 1221, the WiFi module 1223, the BT module 1225, the GPS module 1227, and the NFC module 1228 are illustrated as separate blocks, but at least some (for example, two or more) of the cellular module 1221, the WiFi module 1223, the BT module 1225, the GPS module 1227, and the NFC module 1228 may be included in one Integrated Chip (IC) or one IC package. For example, at least some (for example, a CP corresponding to the cellular module 1221 and a WiFi processor corresponding to the WiFi module 1223) of the processors corresponding to the cellular module 1221, the WiFi module 1223, the BT module 1225, the GPS module 1227, and the NFC module 1228 may be implemented as one SoC.

The RF module 1229 may transmit/receive data, for example, an RF signal. Although not illustrated, the RF module 1229 may include, for example, a transceiver, a Power Amplifier Module (PAM), a frequency filter, a Low Noise Amplifier (LNA), or the like. Further, the RF module 1229 may further include a component for transmitting/receiving electronic waves over a free air space in wireless communication, for example, a conductor, a conducting wire, or the like. Although the cellular module 1221, the Wi-Fi module 1223, the BT module 1225, the GPS module 1227, and the NFC module 1228 share one RF module 1229 in FIG. 12, at least one of the cellular module 1221, the Wi-Fi module 1223, the BT module 1225, the GPS module 1227, and the NFC module 1228 may transmit/receive an RF signal through a separate RF module according to various embodiments of the present disclosure.

The SIM card 1224 may be a card including a subscriber identification module, and may be inserted into a slot formed in a particular portion of the electronic device. The SIM card 1224 may include unique identification information (for example, an Integrated Circuit Card IDentifier (ICCID)) or subscriber information (for example, an International Mobile Subscriber IDentity (IMSI)).

The memory 1230 (for example, the memory 130) may include an internal memory 1232 or an external memory 1234. The internal memory 1232 may include at least one of a volatile memory (for example, a Dynamic Random Access Memory (DRAM), a Static RAM (SRAM), a Synchronous Dynamic RAM (SDRAM), or the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a not and (NAND) flash memory, a not or (NOR) flash memory, or the like).

According to various embodiments of the present disclosure, the embedded memory 1232 may be a Solid State Drive (SSD). The external memory 1234 may further include a flash drive, for example, a Compact Flash (CF), a Secure Digital (SD), a Micro SD (Micro-SD), a Mini SD (Mini-SD), an extreme Digital (xD), a memory stick, or the like. The external memory 1234 may be functionally connected with the electronic device 1201 through various interfaces. According to various embodiments of the present disclosure, the electronic device 1201 may further include a storage device (or storage medium) such as a hard drive.

The sensor module 1240 may measure a physical quantity or detect an operation state of the electronic device 1201, and may convert the measured or detected information to an electrical signal. The sensor module 1240 may include at least one of, for example, a gesture sensor 1240A, a gyro sensor 1240B, an atmospheric pressure sensor 1240C, a magnetic sensor 1240D, an acceleration sensor 1240E, a grip sensor 1240F, a proximity sensor 1240G, a color sensor 1240H (for example, Red, Green, and Blue (RGB) sensor), a bio-sensor 1240I, a temperature/humidity sensor 1240J, an illumination sensor 1240K, and a Ultra Violet (UV) sensor 1240M. Additionally or alternatively, the sensor module 1240 may include, for example, an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor, an iris sensor (not illustrated), a fingerprint sensor, or the like. The sensor module 1240 may further include a control circuit for controlling one or more sensors included in the sensor module 1240.

The input device 1250 may include a touch panel 1252, a (digital) pen sensor 1254, a key 1256, or an ultrasonic input device 1258. The touch panel 1252 may recognize a touch input through at least one of, for example, a capacitive type, a resistive type, an infrared type, and an ultrasonic type. The touch panel 1252 may further include a control circuit. In case of the capacitive type touch panel, physical contact or proximity recognition is possible. The touch panel 1252 may further include a tactile layer. In this instance, the touch panel 1252 may provide a tactile reaction to the user.

The (digital) pen sensor 1254 may be implemented, for example, using a method that is the same as or similar to receiving a user's touch input, or using a separate recognition sheet. The key 1256 may include, for example, a physical button, an optical key, or a keypad. The ultrasonic input device 1258 may identify data by detecting an acoustic wave with a microphone (for example, the microphone 1288) of the electronic device 1201, through an input unit generating an ultrasonic signal, and may perform wireless recognition. According to various embodiments of the present disclosure, the electronic device 1201 may also receive a user input from an external device (for example, a computer or a server) connected thereto by using the communication module 1220.

The display 1260 may include a panel 1262, a hologram device 1264 or a projector 1266. The panel 1262 may be, for example, a Liquid Crystal Display (LCD), an Active Matrix Organic Light Emitting Diode (AM-OLED), or the like. The panel 1262 may be implemented to be, for example, flexible, transparent, or wearable. The panel 1262 may be configured as a single module integrated with the touch panel 1252. The hologram device 1264 may show a stereoscopic image in the air using interference of light. The projector 1266 may project light onto a screen to display an image. The screen may be located, for example, inside or outside the electronic device 1201. According to various embodiments of the present disclosure, the display 1260 may further include a control circuit for controlling the panel 1262, the hologram device 1264, or the projector 1266.

The interface 1270 may include, for example, an HDMI 1272, a USB 1274, an optical interface 1276, or a D-sub-miniature (D-sub) 1278. The interface 1270 may be included in, for example, the communication interface 160 illustrated in FIG. 1. Additionally or alternatively, the interface 1270 may include, for example, a Mobile High-definition Link (MHL) interface, a SD card/Multi-Media Card (MMC) interface, or an Infrared Data Association (IrDA) standard interface.

The audio module 1280 may bilaterally convert a sound and an electronic signal. The audio module 1280 may process sound information input or output through, for example, the speaker 1282, the receiver 1284, the earphones 1286, the microphone 1288, or the like.

The camera module 1291 is a device for photographing a still image and video, and according to various embodiments of the present disclosure, may include one or more image sensors (for example, a front sensor or a rear sensor), a lens (not illustrated), an image signal processor (ISP) (not illustrated), or a flash (for example, an LED or a xenon lamp, not illustrated).

The power management module 1295 may manage power of the electronic device 1201. Although not illustrated, the power management module 1295 may include, for example, a Power Management Integrated Circuit (PMIC), a charger IC, or a battery or fuel gauge. The PMIC may be mounted to, for example, an integrated circuit or an SoC semiconductor.

Charging methods may be classified into a wired charging method and a wireless charging method. The charger IC may charge a battery and prevent over voltage or over current from a charger. According to various embodiments of the present disclosure, the charger IC may include a charger IC for at least one of the wired charging and the wireless charging. Examples of the wireless charging method may include a magnetic resonance type, a magnetic induction type, or an electromagnetic wave type, and an additional circuit for wireless charging, such as a coil loop, a resonance circuit, a rectifier, or the like may be added.

The battery gauge may measure, for example, a remaining capacity of the battery 1296, or a voltage, a current, or a temperature of the battery 1296, for example during charging. The battery 1296 may store or generate electricity, and may supply power to the electronic device 1201 using the stored or generated electricity. The battery 1296 may include, for example, a rechargeable battery or a solar battery.

The indicator 1297 may display a specific state of the electronic device 1201 or the part (for example, the AP 1210) of electronic device 1201, for example, a boot up state, a message state, a charging state, or the like. The motor 1298 may convert an electrical signal to a mechanical vibration. Although not illustrated, the electronic device 1201 may include a processing unit (for example, a GPU) for supporting mobile TV. The processing unit for supporting the mobile TV may process media data according to a standard of Digital Multimedia Broadcasting (DMB), Digital Video Broadcasting (DVB), media flow, or the like.

The aforementioned elements of the electronic device according to various embodiments of the present disclosure may be constituted by one or more components, and the name of the corresponding element may vary with a type of electronic device. The electronic device according to various embodiments of the present disclosure may include at least one of the aforementioned elements. Some elements may be omitted or other additional elements may be further included in the electronic device. Further, some of the components of the electronic device according to the various embodiments of the present disclosure may be combined to form a single entity, and thus, may equivalently execute functions of the corresponding elements prior to the combination.

The "module" used in various embodiments of the present disclosure may refer to, for example, a "unit" including one of hardware, software, and firmware, or a combination of two or more of the hardware, software, and firmware. The "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to various embodiments of the present disclosure may include at least one of an Application-Specific Integrated Circuit (ASIC) chip, a Field-Programmable Gate Arrays (FPGAs), and a programmable-logic device for performing operations which have been known or are to be developed hereafter.

According to various embodiments, at least some of the devices (for example, modules or functions thereof) or the method (for example, operations) according to the present disclosure may be implemented by a command stored in a computer-readable storage medium in a programming module form. When the command is executed by one or more processors (for example, the processor 120), the one or more processors may execute a function corresponding to the command. The computer-readable storage medium may be, for example, the memory 130. At least a part of the programming module may be implemented (for example, executed) by, for example, the processor 120. At least some of the programming modules may include, for example, a module, a program, a routine, a set of instructions or a process for performing one or more functions.

The computer readable recoding medium may include magnetic media, such as a hard disk, a floppy disk and a magnetic tape, optical media, such as a Compact Disc Read Only Memory (CD-ROM) and a DVD, magneto-optical media, such as a floptical disk, and a hardware device specially configured to store and execute a program instruction (for example, a programming module), such as a ROM, a RAM, a flash memory, or the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, a storage medium stores instructions, and the instructions are set to enable at least one processor to execute at least one operation when the instructions are executed by the at least one processor. The at least one operation may include detecting a movement of an electronic device, and changing a scale of a displayed image based on the movement.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An operation method of an electronic device, the method comprising:
    displaying a first image on a display of the electronic device;
    detecting movement of the electronic device using at least one sensor of the electronic device while displaying the first image;
    determining whether an image group comprising the first image exists in the electronic device;
    upon determining that the image group exists, based on the detected movement, determining, among the image group, a second image different from the first image, and displaying the second image; and
    upon determining that the image group does not exist, based on the detected movement, changing an enlargement/reduction scale of the first image, and displaying the first image with the changed scale,
    wherein all images included in the image group were photographed by one photographing device, and the all images include information on moving line of the photographing device while the all images were photographed.

2. The method of claim 1, wherein the all images include at least one of height information of a point of view where each of the all images is photographed, or height information of an object in the each of the all images.

3. The method of claim 1, wherein the movement information of the electronic device includes at least one of a movement acceleration, a movement distance, or a movement direction.

4. The method of claim 1, wherein based on the detected movement, the changing of the enlargement/reduction scale of the first image comprises:
    based on a movement of a body away from the ground, determining an enlargement/reduction scale of the first image.

5. The method of claim 1, further comprising, displaying, based on a predetermined input, a third image which is not grouped with a currently displayed image in lieu of the currently displayed image.

6. The method of claim 1, wherein the at least one sensor includes at least one of an acceleration sensor, a gyro sensor, a geomagnetic sensor, or a tilt sensor.

7. The method of claim 1, wherein the all images include information associated with a chronological sequence of photographing while the all images were photographed.

8. An electronic device comprising:
    a display;
    at least one sensor; and
    a processor configured to:
        display a first image on the display,
        detect movement of the electronic device using the at least one sensor while displaying the first image,
        determine whether an image group comprising the first image exists in the electronic device,
        upon determining that the image group exists, based on the detected movement, determine, among the image group, a second image different from the first image, and display the second image, and
        upon determining that the image group does not exist, based on the detected movement, change an enlargement/reduction scale of the first image, and display the first image with the changed scale,
    wherein all images included in the image group were photographed by one photographing device, and the all images include information on moving line of the photographing device while the all images were photographed.

9. The device of claim 8, wherein the all images include at least one of height information of a point of view where each of the all images is photographed, or height information of an object in the each of the all images.

10. The device of claim 8, wherein the movement information of the electronic device includes at least one of a movement acceleration, a movement distance, or a movement direction.

11. The device of claim 8, wherein the processor is further configured to:
    based on a movement of a body away from the ground, determine an enlargement/reduction scale of the first image.

12. The device of claim 8, wherein the processor is further configured to:
- display, based on a predetermined input, a third image which is not grouped with a currently displayed image in lieu of the currently displayed image.

13. The device of claim 8, wherein the at least one sensor includes at least one of an acceleration sensor, a gyro sensor, a geomagnetic sensor, or a tilt sensor.

14. A non-transient computer readable recording medium that stores a program for implementing a method, the method comprising:
- displaying a first image on a display of an electronic device;
- detecting movement of the electronic device using at least one sensor of the electronic device while displaying the first image;
- determining whether an image group comprising the first image exists in the electronic device;
- upon determining that the image group exists, based on the detected movement, determining, among the image group, a second image different from the first image, and displaying the second image; and
- upon determining that the image group does not exist, based on the detected movement, changing an enlargement/reduction scale of the first image and displaying the first image with the changed scale,
- wherein all images included in the image group were photographed by one photographing device, and the all images include information on moving line of the photographing device while the all images were photographed.

* * * * *